US012585992B2

(12) United States Patent
Gorham et al.

(10) Patent No.: US 12,585,992 B2
(45) **Date of Patent: *Mar. 24, 2026**

(54) MACHINE LEARNING WITH ATTRIBUTE FEEDBACK BASED ON EXPRESS INDICATORS

(71) Applicant: ZixCorp Systems, Inc., Dallas, TX (US)

(72) Inventors: David Gorham, McKinney, TX (US); Michael Don Wigley, Dallas, TX (US); Mark Stephen DeMichele, Ann Arbor, MI (US)

(73) Assignee: ZixCorp Systems, Inc., Dallas, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/894,050

(22) Filed: Aug. 23, 2022

(65) Prior Publication Data

US 2022/0405646 A1 Dec. 22, 2022

Related U.S. Application Data

(63) Continuation of application No. 16/410,412, filed on May 13, 2019, now Pat. No. 11,468,360.

(51) Int. Cl.
G06N 20/00 (2019.01)
G06F 40/279 (2020.01)
G06F 40/30 (2020.01)

(52) U.S. Cl.
CPC ........... G06N 20/00 (2019.01); G06F 40/279 (2020.01); G06F 40/30 (2020.01)

(58) Field of Classification Search
None
See application file for complete search history.

(56) References Cited

U.S. PATENT DOCUMENTS 8,751,424 B1 * 6/2014 Wojcik .................. G06F 16/353
706/20
9,514,414 B1 * 12/2016 Rosswog ................. G06N 5/04
(Continued)

OTHER PUBLICATIONS

Notice of Allowance issued for U.S. Appl. No. 16/194,609, mailed Nov. 10, 2022, 15 pages.
(Continued)

*Primary Examiner* — Mandrita Brahmachari
(74) *Attorney, Agent, or Firm* — Sprinkle IP Law Group

(57) ABSTRACT

In some embodiments, a method comprises receiving an electronic message. In response to determining that the electronic message includes an express indication from a user that a classification applies or does not apply, the method comprises identifying message attributes of the electronic message that correspond to policy attributes of a machine learning policy and determining values of the policy attributes based on the identified message attributes. The method additionally comprises providing information to a machine learning trainer adapted to train the machine learning policy based on the information. The information comprises the values of the policy attributes and information indicating the classification that applies or does not apply to the electronic message, where such information is based on the express indication that the user included in the electronic message.

21 Claims, 9 Drawing Sheets

(56) References Cited

U.S. PATENT DOCUMENTS

| 11,606,365 | B2 | 3/2023 | Potkalesky et al. | |
| 11,930,018 | B2 | 3/2024 | Potkalesky et al. | |
| 11,934,925 | B2 | 3/2024 | Potkalesky et al. | |
| 12,217,141 | B2 | 2/2025 | Potkalesky | |
| 12,483,563 | B2 | 11/2025 | Potalesky et al. | |
| 2004/0215977 | A1 | 10/2004 | Goodman et al. | |
| 2008/0301760 | A1 | 12/2008 | Lim | |
| 2009/0240637 | A1* | 9/2009 | Drissi | G06F 16/353 |
| | | | | 706/12 |
| 2009/0254498 | A1* | 10/2009 | Gupta | G06Q 10/107 |
| | | | | 706/12 |
| 2010/0169480 | A1* | 7/2010 | Pamidiparthi | H04L 51/063 |
| | | | | 709/227 |
| 2011/0131279 | A1* | 6/2011 | Karnik | G06Q 10/107 |
| | | | | 726/1 |
| 2011/0208960 | A1* | 8/2011 | Flood | H04L 63/08 |
| | | | | 713/153 |
| 2011/0219081 | A1 | 9/2011 | Parthasarathy et al. | |
| 2016/0321582 | A1* | 11/2016 | Broudou | G06N 20/00 |
| 2016/0352694 | A1 | 12/2016 | Lim et al. | |
| 2019/0065742 | A1* | 2/2019 | Humphries | G06N 20/00 |
| 2019/0166161 | A1* | 5/2019 | Anand | G06N 20/00 |
| 2020/0233926 | A1* | 7/2020 | Ghatak | G06Q 10/107 |
| 2020/0410116 | A1* | 12/2020 | Williamson | G06F 21/6254 |
| 2024/0169266 | A1 | 5/2024 | Potkalesky et al. | |
| 2024/0223572 | A1 | 7/2024 | Potkalesky et al. | |

OTHER PUBLICATIONS

Office Action for European Patent Application No. 19198163.8, dated Nov. 30, 2022, 6 pgs.

Office Action issued for U.S. Appl. No. 18/408,692, mailed Apr. 17, 2025, 13 pages.

Office Action issued for U.S. Appl. No. 17/720,737, mailed Jul. 10, 2023, 18 pages.

Office Action issued for U.S. Appl. No. 18/166,697, mailed Jun. 23, 2023, 12 pages.

Notice of Allowance issued for U.S. Appl. No. 18/166,697, mailed Oct. 12, 2023, 8 pages.

Notice of Allowance issued for U.S. Appl. No. 17/720,737, mailed Nov. 1, 2023, 8 pages.

Notice of Allowance issued for U.S. Appl. No. 18/408,692, mailed Jul. 17, 2025, 9 pages.

Notice of Allowance issued for U.S. Appl. No. 18/408,692, mailed Oct. 27, 2025, 9 pages.

Office Action issued for U.S. Appl. No. 18/408,692, mailed Sep. 30, 2024, 12 pages.

Notice of Allowance issued for U.S. Appl. No. 18/428,299, mailed Sep. 27, 2024, 11 pages.

* cited by examiner

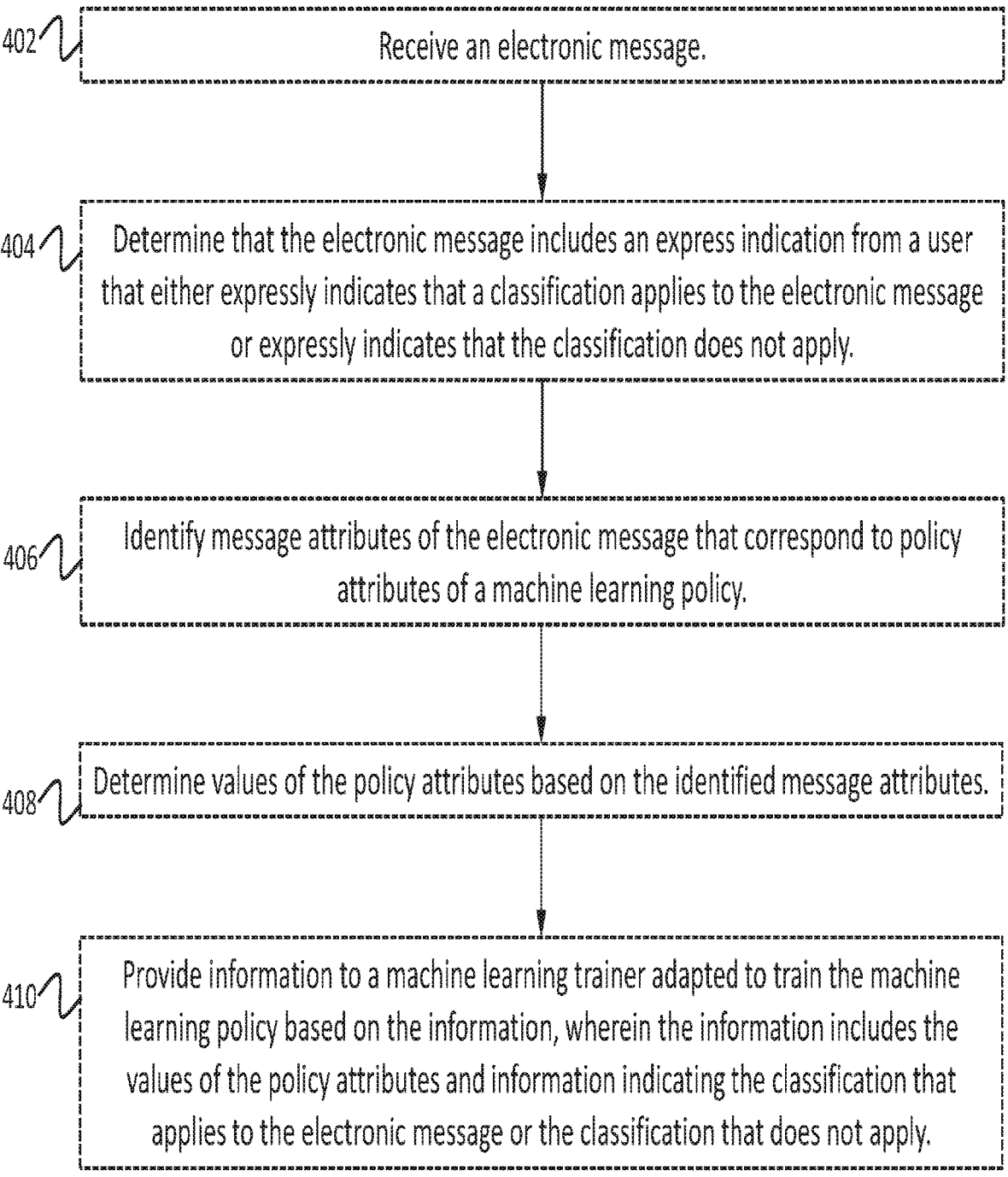

402 — Receive an electronic message.

404 — Determine that the electronic message includes an express indication from a user that either expressly indicates that a classification applies to the electronic message or expressly indicates that the classification does not apply.

406 — Identify message attributes of the electronic message that correspond to policy attributes of a machine learning policy.

408 — Determine values of the policy attributes based on the identified message attributes.

410 — Provide information to a machine learning trainer adapted to train the machine learning policy based on the information, wherein the information includes the values of the policy attributes and information indicating the classification that applies to the electronic message or the classification that does not apply.

*FIG. 4*

| Attribute | Value |
|-----------|-------|
| A | 1 |
| B | 0 |
| C | 1 |
| D | 1 |
| E | 0 |
| F | 1 |
| G | 0 |
| H | 0 |
| I | 1 |
| J | 1 |
| Result | Sensitive |

FIG. 5A

| Attribute | Value |
|-----------|-------|
| A | 0 |
| B | 1 |
| C | 1 |
| D | 1 |
| E | 0 |
| F | 1 |
| G | 0 |
| H | 0 |
| I | 0 |
| J | 0 |
| Result | Not Sensitive |

FIG. 5B

MACHINE LEARNING WITH ATTRIBUTE FEEDBACK BASED ON EXPRESS INDICATORS

CROSS-REFERENCE TO RELATED APPLICATION(S)

This application is a continuation of, and claims a benefit of priority under 35 U.S.C. 120 from, U.S. patent application Ser. No. 16/410,412, filed May 13, 2019, issued as U.S. Pat. No. 11,468,360, entitled "MACHINE LEARNING WITH ATTRIBUTE FEEDBACK BASED ON EXPRESS INDI-CATORS," which is fully incorporated by reference herein for all purposes.

TECHNICAL FIELD

Certain embodiments of the present disclosure relate generally to handling electronic messages and, more particularly, certain embodiments relate to creating a machine learning policy with attribute feedback based on express indicators of the electronic messages.

BACKGROUND

In a computer network, a sender may transmit files, email messages, and other data to a recipient. When sending the data, the sender may request that the data be handled in a certain way. As an example, the sender may request that the data be encrypted to comply with a regulatory policy, such as a regulatory policy requiring encryption of emails containing sensitive, personal information. Various techniques exist for encrypting data. As one example, public key encryption is a technique that may be used to encrypt data. In public key encryption, two separate keys are associated with the recipient, a public key and a corresponding private key. The sender obtains the recipient's public key, encrypts the data using the public key, and transmits the encrypted data to the recipient. The recipient decrypts the encrypted data using its corresponding private key. This technique protects the data from unauthorized recipients that do not possess the private key.

SUMMARY

According to certain embodiments, a system is disclosed. The system is configured to receive and process a plurality of electronic messages. For each electronic message, the system sends the electronic message to a machine learning scanner. The machine learning scanner is adapted to use a machine learning policy to determine whether a classification applies to the electronic message. In response to the machine learning scanner determining that the classification applies to the electronic message, the system provides the electronic message to an enforcer that is adapted to apply the classification to the electronic message. In response to the machine learning scanner determining that the classification does not apply to the electronic message, the system determines whether the electronic message includes an express indication from the user that either expressly indicates that the classification applies to the electronic message or expressly indicates that the classification does not apply to the electronic message. To determine whether the electronic message includes the express indication from the user, the system is further configured to determine that the electronic message includes the express indication that the classification applies when a subject line of the electronic message includes an affirmative keyword. The system is also configured to determine that the electronic message includes the express indication that the classification does not apply when the subject line of the electronic message includes a negative keyword. The system is additionally configured to determine that the subject line does not include the express indication from the user when the affirmative keyword and the negative keyword are absent from the subject line. In response to determining that the subject line contains the affirmative keyword, the system provides the electronic message to the enforcer that is adapted to apply the classification to the electronic message. In response to determining that the subject line does not contain the affirmative keyword, the system abstains from applying the classification to the electronic message. In response to determining that the electronic message includes the express indication from the user that either expressly indicates that the classification applies to the electronic message or expressly indicates that the classification does not apply to the electronic message, the system identifies message attributes of the electronic message that correspond to policy attributes of the machine learning policy. The system further determines values of the policy attributes based on the identified message attributes. The system additionally provides information to a machine learning trainer adapted to train the machine learning policy based on the information. The information includes the values of the policy attributes and information indicating the classification that applies to the electronic message or the classification that does not apply to the electronic message, where such information is based on the express indication that the user included in the electronic message.

According to certain embodiments, a method is disclosed. The method comprises receiving an electronic message. The method further comprises determining that the electronic message includes an express indication from a user that either expressly indicates that a classification applies to the electronic message or expressly indicates that the classification does not apply to the electronic message. In response to determining that the electronic message includes the express indication from the user, the method additionally comprises identifying message attributes of the electronic message that correspond to policy attributes of a machine learning policy. The method further comprises determining values of the policy attributes based on the identified message attributes. The method additionally comprises providing information to a machine learning trainer adapted to train the machine learning policy based on the information. The information comprises the values of the policy attributes and information indicating the classification that applies to the electronic message or the classification that does not apply to the electronic message, where such information is based on the express indication that the user included in the electronic message.

According to certain embodiments, a system is disclosed. The system comprises processing circuitry and a memory. The memory comprises logic that, when executed by the processing circuitry, cause the processing circuitry to receive an electronic message. The logic further causes the processing circuitry to determine that the electronic message includes an express indication from a user that either expressly indicates that a classification applies to the electronic message or expressly indicates that the classification does not apply to the electronic message. In response to determining that the electronic message includes the express indication from the user, the logic further causes the processing circuitry to identify message attributes of the electronic message that correspond to policy attributes of a machine learning policy. The logic also causes the processing circuitry to determine values of the policy attributes based on the identified message attributes. The logic additionally causes the processing circuitry to provide information to a machine learning trainer adapted to train the machine learning policy based on the information. The information comprises the values of the policy attributes and information indicating the classification that applies to the electronic message or the classification that does not apply to the electronic message, where such information is based on the express indication that the user included in the electronic message.

Certain embodiments of the above-described system, method, and/or logic may each include additional features, such as any one or more of the following features:

In some embodiments, at least some of the policy attributes are based on a regulatory policy.

In some embodiments, a determination is made whether the regulatory policy applies to the user. In response to determining that the regulatory policy applies to the user, the machine learning policy is enabled to use the policy attributes that are based on the regulatory policy. In response to determining that the regulatory policy does not apply to the user, the machine learning policy is disabled from using the policy attributes that are based on the regulatory policy.

In some embodiments, the determination of whether the electronic message includes the express indication from the user comprises determining that the electronic message includes the express indication that the classification applies when a subject line of the electronic message includes an affirmative keyword. The determination of whether the electronic message includes the express indication further comprises determining that the electronic message includes the express indication that the classification does not apply when the subject line of the electronic message includes a negative keyword. The determination of whether the electronic message includes the express indication additionally comprises determining that the subject line does not include the express indication when the affirmative keyword and the negative keyword are absent from the subject line.

In some embodiments, a second electronic message is received and sent to a machine learning scanner adapted to apply the machine learning policy. The machine learning policy determines a confidence level that the classification applies to the second electronic message based on comparing content of the second electronic message to the policy attributes of the machine learning policy. In response to determining that the confidence level that the classification applies to the second electronic message exceeds a threshold, the second message is provided to an enforcer adapted to apply the classification to the second electronic message. In certain such embodiments, the threshold is adjustable by the user.

In some embodiments, the machine learning policy comprises a pre-defined set of the policy attributes. In such embodiments, determining the values of the policy attributes comprises, for each policy attribute in the pre-defined set, setting the value associated with the policy attribute to a first value when a corresponding message attribute has been identified in the electronic message. Determining the values of the policy attributes further comprises setting the value associated with the policy attribute to a second value when a corresponding message attribute has not been identified in the electronic message. The second value is different than the first value.

In some embodiments, a second electronic message is received, and the machine learning policy is used along with one or more other policies to determine whether the classification applies to the second electronic message. The machine learning policy and the one or more other policies are combined using Boolean logic.

In some embodiments, the machine learning policy corresponds to one of a plurality of machine learning policies determined by the machine learning trainer, and an indication of which of the machine learning policies to train with the electronic message is provided to the machine learning trainer.

Some embodiments of the disclosure may provide one or more technical advantages. A technical advantage of certain embodiments may include eliminating user error by applying machine learning to electronic messages that include information governed by government regulatory policies. As an example, a user may send an electronic message containing a patient's healthcare information without realizing that the Health Insurance Portability and Accountability Act of 1996 (HIPAA) requires encryption of the message. The machine learning scanner is operable to scan the message, identify attributes related to the regulatory policy, and determine that the electronic message requires encryption. Certain embodiments may additionally eliminate user error by applying machine learning to elements of electronic messages the user is unlikely or unable to review, including but not limited to files and attachments, metadata, hyperlinks and their content, and other electronic messages being transmitted within the network or by similar users outside the network. For example, one user may attach a large file to an electronic message that on its face does not appear to need encryption. The machine leaning scanner is operable to scan the large file much faster than a human user and can determine that the file does need encryption. The machine learning scanner can then send that electronic message to an enforcer configured to apply the proper encryption before the electronic message reaches its intended recipient. Thus, certain embodiments may reduce the risk of human error by automatically applying the required classification or classifications to an electronic message.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 4 illustrates an example of a method for generating a machine learning policy, in accordance with certain embodiments.

FIGS. 5A and 5B illustrate examples of values set for various regulatory policy attributes based on the presence of corresponding attributes in an electronic message, in accordance with certain embodiments.

DETAILED DESCRIPTION

Figure 1:
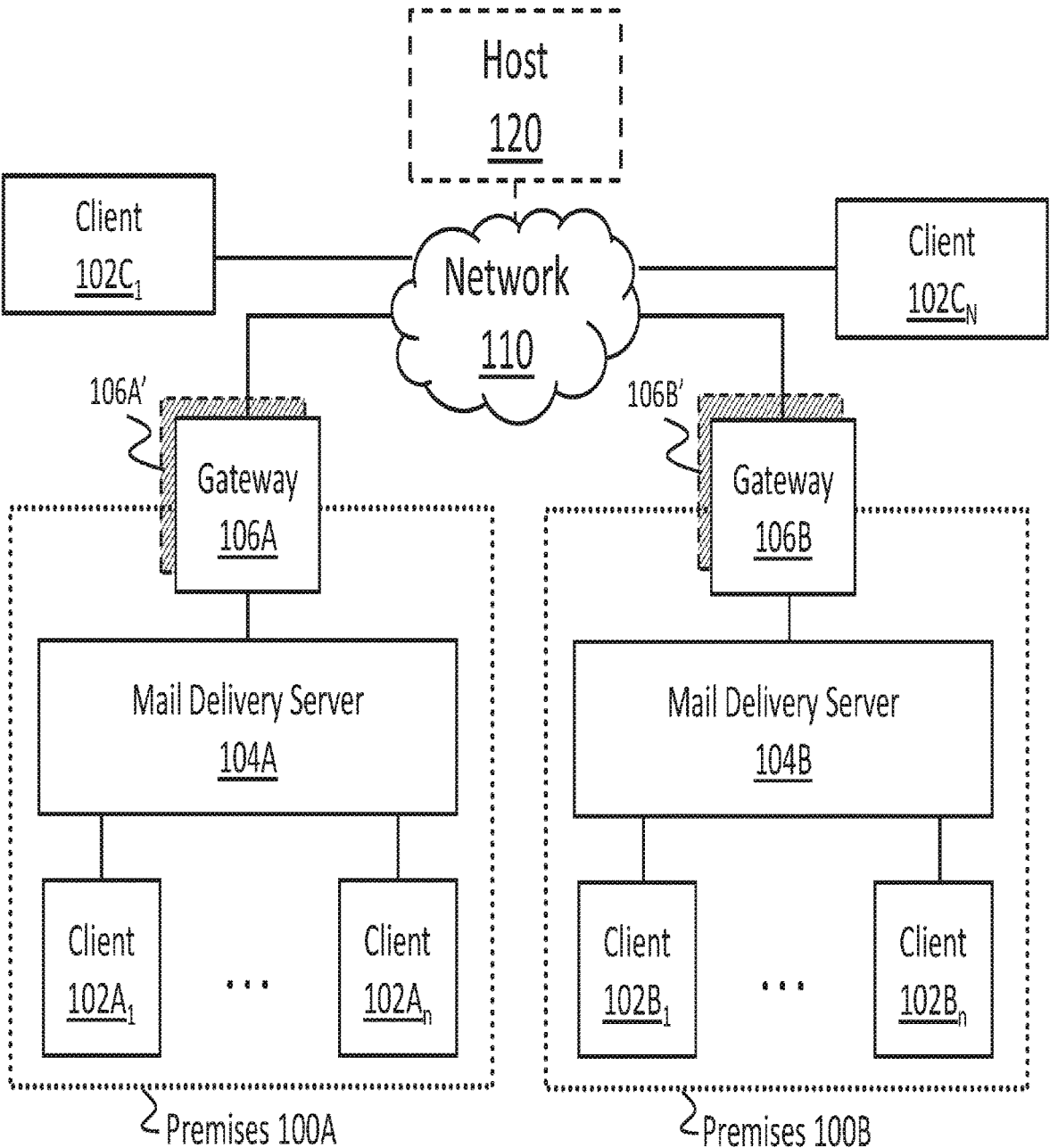
FIG. 1 illustrates an example of a computer network for delivery of an electronic message, in accordance with certain embodiments.

Embodiments of the present invention are described in FIGS. 1 through 6 of the drawings, like numerals being used for like and corresponding parts of the various drawings.

Policies create requirements to be complied with when sending electronic messages. As an example, regulatory policies enacted by federal and state governments create requirements with which companies must comply when sending electronic messages. As another example, company policies may create requirements with which employees must comply when sending electronic message. Such requirements may be based on the company's internal requirements, customer requirements, industry best practices, and/or other suitable requirements. Certain policies may determine whether an electronic message contains sensitive and/or personal information and, if so, may require one or more actions, such as increasing security (e.g., encrypting the electronic message), retaining/archiving the electronic message, and so on.

When sending an electronic message to a recipient, a sender, himself, may request that the electronic message be handled in a certain way to comply with one or more policies. In some cases, instructions for handling the electronic message may be provided manually. For example, a user may provide instructions for handling the message via an interface that allows the user to type a command, click a button, select a menu item, etc. However, errors can occur when relying on the user to manually provide such instructions. For example, the user may occasionally forget to provide instructions or may inadvertently provide incorrect instructions. As a specific example, a user may send an electronic message containing a patient's healthcare information without realizing that the Health Insurance Portability and Accountability Act of 1996 (HIPAA) requires the message to be secured during transit. To address this problem, computing systems may implement policies that provide rules for handling electronic messages. As an example, a policy may indicate that electronic messages containing certain key words are to be encrypted. However, such policies are typically either under inclusive (when they specify a small number of key words, none of which are included in many types of sensitive messages) or over inclusive (when they specify a large number of key words, some of which are found in non-sensitive messages). Additionally, the characteristics that should cause an electronic message to be handled in a particular way may change over time, which means that such policies may become outdated.

Certain embodiments of the present disclosure provide techniques for developing robust policies and ensuring that the policies are up-to-date. According to certain embodiments, machine learning can be used to build policies for handling electronic messages. As an example, given a set of attributes specified for a particular regulatory policy, a machine learning trainer can extract such attributes from electronic messages for which a regulatory policy is known to apply and electronic messages for which the regulatory policy is known not to apply, to determine a machine learning policy that uses these attributes to determine that a classification does or does not apply to a given electronic message. The set of attributes provided to the machine learning trainer is predetermined. As a specific example, the set of attributes may include attributes based on the HIPAA regulatory policy and chosen to help identify those electronic messages that contain sensitive healthcare information. In certain embodiments, the set of attributes contain both attributes that tend to indicate that a classification applies to a given electronic message as well as attributes that tend to indicate that a classification does not apply.

Once trained, the machine learning policy can be used to determine that a classification applies to a new electronic message (e.g., the electronic message contains sensitive information) or that a classification does not apply to the new electronic message (e.g., the electronic message does not contain sensitive information), based on the presence (or absence) of particular attributes. If the machine learning policy determines that a classification applies to the message, the message is subsequently sent to an enforcer, which applies the classification. As an example, if the enforcer receives a message with a classification indicating that the message should be encrypted, the enforcer encrypts the message. If the machine learning policy determines that a classification does not apply to an electronic message the electronic message is subsequently scanned for the presence of an express indication that the classification should or should not apply. For example, an express indication that a classification applies could include the presence of an affirmative keyword in the subject line of the message, such as "classified" or "secure." Similarly, an express indication that a classification does not apply could include the presence of a negative keyword in the subject line of the message, such as "unclassified."

This disclosure contemplates that users may use any suitable technique to electronically indicate which classification applies to an electronic message. As an example, prior to sending the electronic message, a user may configure a flag indicating that the electronic message should be encrypted. The flag may be configured in any suitable manner, such as by typing a command, clicking a button, selecting a menu item, etc. In some embodiments, if the flag indicates that the electronic message should be encrypted, a header may be added to the electronic message to ensure that the electronic message is sent to an encryption module. In some embodiments, customers can build keyword policies that will cause an electronic message to be encrypted. Customers often use these types of policies to allow users to specify which emails need to be encrypted, often by watching for the word "Encrypt" in a subject line. As another example, after sending the electronic message, a user (such as an administrator) can provide feedback indicating that the electronic message contains attributes that warrant encryption. In some embodiments, the administrator can mark archived messages as "encrypt" or "not encrypt" messages. Examples of products that enable a user to indicate that an electronic message needs to be encrypted include ZixSelect and ZixDLP (which support Encrypt & Send flags) and ZixArchive (which supports administrator feedback).

If the electronic message contains an express indication that a classification applies, the set of attributes associated with the machine learning policy is extracted from the electronic message and provided to the machine learning trainer, along with the express indication that the classification applies. These are then used to dynamically update the machine learning policy. Additionally, the message is sent to the enforcer, which applies the classification and then sends the message to its intended recipient.

Similarly, if the electronic message contains an express indication that a classification does not apply, the set of attributes associated with the machine learning policy are extracted from the electronic message and provided to the machine learning trainer, along with the express indication that the classification does not apply. These are then used to dynamically update the machine learning policy. Additionally, the message is sent to its intended recipient, bypassing the enforcer, because a classification does not need to be applied to the message.

FIG. 1 illustrates an example of a computer network for delivery of an electronic message, in accordance with certain embodiments. The computer network may include a plurality of clients 102 operable to send and receive electronic messages via an interconnecting network 110. Each client 102 may include any suitable combination of hardware and/or software, such as one or more interfaces, processing circuitry, and/or one or more memories, examples of which are described in more detail with respect to FIG. 6 below. In certain embodiments, client 102 may refer to a user device (e.g., a laptop computer, desktop computer, mobile phone, etc.) or an application of the user device through which a user accesses the user's mailbox to compose outbound emails, view inbound emails, and so on, such as Microsoft Outlook®, Lotus Notes®, Google Gmail®, a secure mail plug-in, etc. The user may refer to any suitable user, such as the sender of the message or an administrator (e.g., an information technology specialist authorized to manage computing resources or services used by the sender of the message).

In certain embodiments, the computing network includes one or more mail delivery servers 104 and gateways 106 to facilitate communicating email between clients 102 via network 110. A mail delivery server 104 may refer to a server that delivers email to the user's mailbox. As one example, a Microsoft Exchange® server may be used as mail delivery server 104. In some embodiments, mail delivery server 104 may correspond to a particular domain. For example, mail delivery server 104A may correspond to Company A and may deliver emails to and from the domain @CompanyA.com. Mail delivery server 104B may deliver emails within a different domain, such as @CompanyB.com, and may deliver emails to and from mail applications associated with Company B.

Gateway 106 may refer to a mail relay positioned between a private network (such as Company A's network) and an outside network (such as the Internet or Company B's network). In some embodiments, gateway 106 may be positioned at the edge of the private network. As an example, gateway 106A may receive email from mail delivery server 104A, apply policies for sending email to the outside network, and then forward the email to the outside network (e.g., via network 110). Similarly, gateway 106A may receive email from the outside network (e.g., via network 110), apply policies for receiving email from the outside network, and then forward the email to mail delivery server 104A for delivery to the appropriate mailbox. In some embodiments, redundant gateways may be used to provide load balancing, disaster recovery, or other redundancy. For example, gateway 106A' may operate as a redundant gateway for gateway 106A. In embodiments in which gateway 106A maintains a local copy of a machine learning policy, redundant gateway 106A' may also maintain a local copy of the machine learning policy so that either gateway is prepared to apply the policy to email.

In the example shown in FIG. 1, clients 102A.sub.1-N, mail delivery server 104A, and gateway 106A are associated with premises 100A, and clients 102B.sub.1-N, mail delivery server 104B, and gateway 106B are associated with premises 100B. A premises 100 may refer to a private network or domain associated with an entity, such as Company A or Company B. In some embodiments, premises 100A may comprise computing equipment, such as mail delivery server 104A and gateway 106A, physically located on-site in a building of Company A. As further discussed below, in certain embodiments, on-premises computing equipment may be used to provide some or all of the functionality associated with generating and applying machine learning policies. In addition, or in the alternative, a host 120 may be used to provide some or all of the functionality associated with generating and applying machine learning policies.

As shown in FIG. 1, the computer network may optionally include one or more hosts 120, depending on the embodiment. Host 120 may provide computing services to clients 102 via network 110. For example, network 110 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. In some embodiments, host 120 may be administered by a third party (e.g., a party other than Company A or Company B), such as a third-party encryption service. Host 120 may provide computing services to any of clients 120A.sub.1-N associated with Company A, clients 120B.sub.1-N associated with Company B, and/or clients 102C.sub.1-N (which need not be associated with a particular company and need not be delivered through mail delivery server 104 and gateway 106). In certain embodiments, host 120 may comprise a secure webmail delivery portal, such as a ZixPort®, that provides secure webmail accounts to users.

In some embodiments, the components of the computer network illustrated in FIG. 1 may communicate using a shared protocol, such as Simple Mail Transfer Protocol (SMTP). In other embodiments, certain components may communicate using different protocols in which case protocol converters may be included to convert between the different protocols.

FIGS. 2, and 3A through 3D illustrate examples of components that may be included in the computer network of FIG. 1. The components may be included in any suitable location within the computer network, such as within client 102, mail delivery server 104, gateway 106, and/or host 120. For example, in certain embodiments, the components may be located within a gateway 106. In other embodiments, the components may be located within host 120. In other embodiments, the components may be distributed throughout the network. For example, some of the components may be located within a gateway 106 and other components may be located within host 120.

Figure 2:
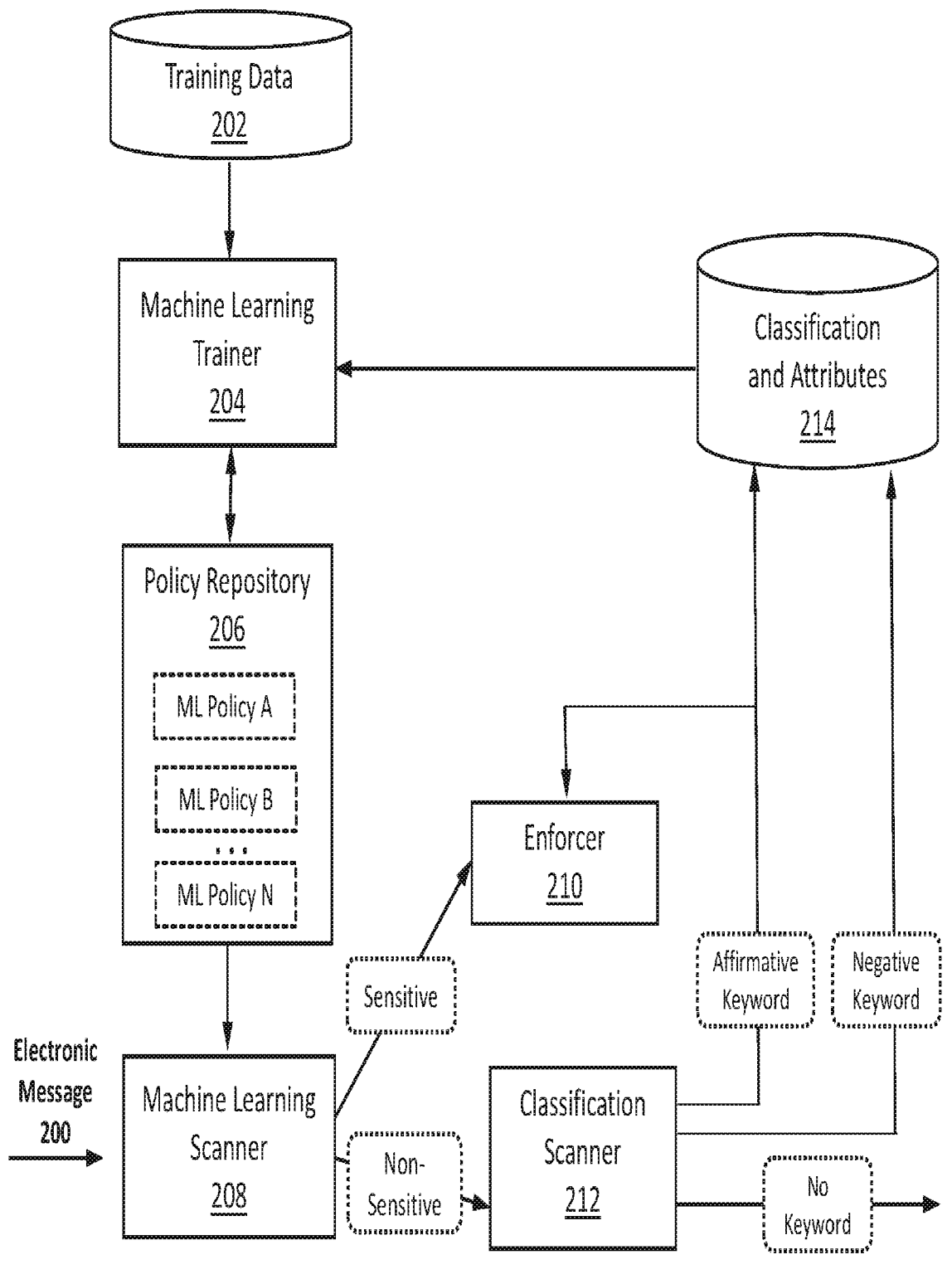
FIG. 2 illustrates an example of components that may be included in the computer network and that may facilitate generating a machine learning policy and applying the machine learning policy to an electronic message, in accordance with certain embodiments.

FIG. 2 illustrates an example of components that may be included in the computer network of FIG. 1 and that may facilitate generating a machine learning policy and applying a machine learning policy, in accordance with certain embodiments. The components illustrated in FIG. 2 include a training data storage element 202, a machine learning trainer 204, a policy repository 206, a machine learning scanner 208, an enforcer 210, a classification scanner 212, and an attributes and classification storage element 214.

Training data storage element 202 is a database, network storage element, or any other appropriate electronic data storage device. In certain embodiments, training data storage element 202 stores electronic messages to which a classification is known to apply as well as electronic messages to which a classification is known not to apply. In certain other embodiments, training data storage element 202 stores values of attributes extracted from electronic messages to which a classification is known to apply, and values of attributes extracted from electronic messages to which a classification is known not to apply. The data stored in training data storage element 202 is used by machine learning trainer 204 to train one or more machine learning policies stored in policy repository 206.

Machine learning trainer 204 may comprise a machine learning engine, like scikit or TensorFlow, adapted to determine (e.g., generate or update) a machine learning (ML) policy by associating attributes of electronic messages with classifications known to apply to the messages. The machine learning engine may use any suitable classification model or machine learning algorithm (including any deep learning algorithms or neural network tools) to determine a machine learning policy. A machine learning policy may be determined for a particular type of classification (such as encryption) or a combination of classifications. As an example, a machine learning policy may include a rule that an electronic message with attributes A, B, and C should be encrypted and archived, and the machine learning policy may include another rule that an electronic message with attributes A, B, and D should be encrypted and branded. Examples of classifications that may apply to electronic message 200 include encryption (or non-encryption), quarantine (or non-quarantine), archive (or non-archive), and/or brand (or non-brand) classifications.

Machine learning trainer 204 trains machine learning policies A through N using a set of given attributes. The set of attributes used by machine learning trainer 204 is predetermined and provided to machine learning trainer 204 by a system administrator, a sender of electronic messages, or any other individual associated with the computer network of FIG. 1. In certain embodiments, the set of attributes contains attributes based on one or more regulatory policies (e.g., HIPAA). Examples of attributes that may be included in a machine learning policy include the presence or absence of certain words or phrases (for example, in the context of a HIPAA regulatory policy, such words could include the name of a particular medical condition or medication), the presence of particular patterns (for example, an arrangement of numbers in the format of a social security number), the frequency with which certain words or phrases appear in the electronic message, the sender of the electronic message, the recipient of the electronic message, the domain of the sender, the domain of the recipient, message size, whether the electronic message includes certain attachments, whether the electronic message includes links to certain data, whether the electronic message is associated with certain metadata, whether the electronic message or its contents are associated with certain computing resources (such as a private/classified portion of a network or storage media), the date of the electronic message, other suitable attributes, or any combination of the preceding.

Machine learning trainer 204 may communicate with policy repository 206 to store and retrieve one or more machine learning policies, such as ML policy A, ML policy B, . . . and ML policy N. Policy repository 206 may comprise any suitable computer-readable storage medium, such as local memory of machine learning trainer 204, an external database that machine learning trainer 204 may access via a network, or other computer-readable storage medium. Each ML policy may be associated with either a particular user or a group of users having one or more characteristics in common. As an example, an ML policy may be associated with all of the employees of Company A, with all of the members of department X within Company A, with all of the customers of host 120 that belong to the same industry (e.g., an ML policy for the medical industry may be trained to recognize and encrypt electronic messages containing patient records, and that ML policy could be applied to different customers in the medical industry, such as Hospital A and Hospital B), or any other group.

Machine learning scanner 208 receives an electronic message 200 from a user via client 102. In certain embodiments, the user from whom electronic message 200 is received may be a sender of electronic message 200 or an administrator authorized to manage electronic message 200. Examples of electronic message 200 may include an email, SMTP message, text message, instant message, voice message, and/or an attachment to a secondary electronic message.

In response to receiving an electronic message 200, machine learning scanner 208 applies machine learning policies stored in policy repository 206 to electronic message 200 to determine whether a classification applies to the message. In certain embodiments, machine learning scanner 208 first determines which attributes of the machine learning policy apply to the user from whom electronic message 200 was received. As an example, machine learning scanner 208 may determine whether a regulatory policy applies to the user. If machine learning scanner 208 determines that the regulatory policy applies to the user, machine learning scanner 208 enables the machine learning policy assigned to such user to use those attributes in the set of attributes that are based on the regulatory policy. If machine learning scanner 208 determines that a regulatory policy does not apply to the user, machine learning scanner 208 disables the machine learning policy assigned to such user from using those attributes in the set of attributes that are based on the regulatory policy.

As another example, suppose host 120 hosts an email delivery service that provides policy-enforcement for various customers, such as customers in the healthcare industry, customers in the financial services industry, and customers in the technology industry. Host 120 may apply healthcare-specific policies to customers in the healthcare industry, but need not apply healthcare-specific policies to customers in the other industries. Similarly, host 120 may apply financial services-specific policies to customers in the financial services industry, but need not apply financial services-specific policies to customers in other industries. In some embodiments, this approach may improve efficiency because policies need not be applied when they are not needed, thereby saving time and/or computing resources. In some embodiments, this approach may prevent false-positives. For example, the format xxx-xx-xxxx may warrant the application of a policy when used by a customer in the healthcare industry (e.g., the format is likely a social security number that requires increased security), but the same format might not warrant the application of a policy when used by a customer in the technology industry (e.g., if the company uses the xxx-xx-xxxx format to refer to a part number of a product that it sells, then the format does not suggest a need for increased security). Thus, in the example, the attribute that checks for the xxx-xx-xxxx format may be enabled for customers in the healthcare industry and disabled for customers in the technology industry.

As described above, machine learning scanner 208 applies machine learning policies stored in policy repository 206 to electronic message 200 to determine whether a classification applies to the message. In certain embodiments, machine learning scanner 208 determines whether a classification applies to an electronic message 200 by identifying message attributes of the electronic message that correspond to attributes of the machine learning policy. Specifically, in certain embodiments, for each policy attribute in the set of attributes, machine learning scanner 208 sets the value associated with the policy attribute to a first value when a corresponding message attribute has been identified and sets the value associated with the policy attribute to a second value different from the first value when a corresponding message attribute has not been identified. The first value may be set to "1," "true," "yes," or any other appropriate value, while the second value may be set to "0," "false," "no," or any other appropriate value different from the first value.

Once machine learning scanner 208 has assigned values to each attribute in the set of attributes, it then determines a confidence level that the classification applies to electronic message 200, based on the values of the attributes. If the confidence level that the classification applies to electronic message 200 exceeds a threshold, machine learning scanner 208 determines that the classification applies to the message. If the confidence level that the classification applies to electronic message 200 does not exceed the threshold, machine learning scanner 208 determines that the classification does not apply to the message. In certain embodiments, the threshold is adjustable. For example, in certain embodiments, the threshold is adjustable by the user from whom electronic message 200 was received. In other embodiments, the threshold is adjustable by a system administrator. An adjustable threshold may be desirable to take into account different risk preferences. For example, those users/system administrators who are risk averse may desire a low threshold, to help ensure that all messages that require classification are classified, despite the fact that this will likely result in classifications applied to messages which do not actually need to be classified, wasting system resources. On the other hand, those users/system administrators who are risk-preferring and/or who wish to limit the number of false positives determined by the system may choose a high threshold, to conserve system resources by applying classifications to only those messages that most obviously require them.

In certain embodiments, once machine learning scanner 208 has determined either that a classification applies to a particular message or that the classification does not apply to the message, machine learning scanner 208 additionally determines whether a second, independent gateway policy indicates that the classification does or does not apply to the message. As an example, a second policy might use a lexicon containing particular words, phrases, and/or formats of text to classify a particular electronic message. If the message contains one or more of the words, phrases, and/or formats of text stored in the lexicon, the second policy may determine that a classification applies to the message. On the other hand, if the message does not contain at least one of the words, phrases, and/or formats of text stored in the lexicon, the second policy may determine that the classification does not apply to the message.

The results of the machine learning scanner 208 and the second policy may then be combined in a variety of different ways. For example, in certain embodiments, the results of the machine learning scanner 208 and the second policy may be combined using the Boolean AND operator, such that a classification is deemed to apply to an electronic message only if both the machine learning scanner 208 and the second policy determine that the classification applies to the message. This may be desirable for those users/system administrators who are risk-preferring and/or who wish to limit the number of false positives determined by the system. On the other hand, in certain embodiments, the results of the machine learning scanner 208 and the second policy may be combined using the Boolean OR operator, such that a classification is deemed to apply to an electronic message if either the machine learning scanner 208 or the second policy determines that the classification applies to the message. This may be desirable for those users/system administrators who are risk averse. The Boolean logic may take a confidence level into consideration. For example, the Boolean logic may use an AND operator when the confidence level of machine learning scanner 208 is below a threshold W or the second policy is below a threshold X, and the Boolean logic may use an OR operator when the confidence level of machine learning scanner 208 is above a threshold Y or the confidence level of the second policy is above a threshold Z (wherein thresholds W, X, Y, and/or Z may have the same values or different values). In certain embodiments, machine learning scanner 208 applies the second policy to the electronic message and combines the results of the machine learning policy and the second policy using Boolean logic. In other embodiments, this is performed by a separate component included in the computer network of FIG. 1.

If machine learning scanner 208 determines that at least one classification applies to electronic message 200, it sends the message to enforcer 210. Enforcer 210 is adapted to apply one or more classifications to an electronic message 200. For example, enforcer 208 may encrypt, quarantine, archive, and/or brand electronic message 200A depending on which classification(s) apply. After applying the one or more classifications to the electronic message, enforcer 210 sends electronic message 200 to the intended recipient.

If machine learning scanner 208 determines that a classification does not apply to electronic message 200, it sends the message to classification scanner 212. Classification scanner 212 determines whether the user has expressly indicated that a classification applies to electronic message 200. For example, classification scanner 212 may include one or more scanners adapted to scan the electronic message to determine whether the user has expressly indicated that a certain classification applies. In some embodiments, a classification may be used to ensure that the electronic message complies with a policy, a rule, a user preference, or other compliance criteria associated with the classification. As discussed above, examples of classifications that may apply to electronic message 200 include encryption (or non-encryption), quarantine (or non-quarantine), archive (or non-archive), and/or brand (or non-brand) classifications. Accordingly, classification scanner 212 may include an encryption scanner, a quarantine scanner, an archive scanner, a brand scanner, and/or other suitable scanner(s).

The encryption scanner determines whether the user has expressly indicated that the electronic message is to be encrypted. The quarantine scanner determines whether the user has expressly indicated that the electronic message is to be quarantined. As an example, a user may indicate to quarantine certain electronic messages in order to perform security procedures, such as malware detection and reme-diation. The archive scanner determines whether the user has expressly indicated that the message is to be archived. As an example, a user may indicate to archive an important elec-tronic message in a database or file management system for future reference. The brand scanner determines whether the user has expressly indicated that the message is to be branded. As an example, a user may indicate to brand the electronic message with a business logo or trade dress, a designation (e.g., "confidential," "proprietary," "draft"), a watermark (e.g., recipient's name, date, etc.), or other infor-mation.

Classification scanner 212 may include various types of scanners within the same scanner, or different types of scanners may be provided in separate classification scanners 212. Any suitable number of scanners may be used, and certain types of scanners may be added or omitted, depend-ing on the embodiment. Additionally, certain scanners may be configured to scan outbound electronic messages, certain scanners may be configured to scan inbound electronic messages, and certain scanners may be configured to scan both outbound and inbound electronic messages.

As described above, classification scanner 212 determines whether the user has expressly indicated that a classification applies to electronic message 200. When sending electronic message 200, the user may expressly indicate that a classi-fication applies by including a keyword that classification scanner 212 associates with enabling the classification (such as including the word "encrypt" in the subject line of an email to enable an encryption classification), or by typing a command, clicking a button, selecting a menu item, or using any other suitable technique to configure a flag indicating that a classification applies. Additionally, certain embodi-ments enable a user (sender or administrator) to provide feedback that expressly indicates that a previously sent electronic message 200 should be used to train machine learning trainer 204 with respect to the classification. As an example, an administrator may review archived electronic messages 200 and may expressly indicate how machine learning trainer 204 should classify the archived electronic messages 200.

If the user has expressly indicated that a classification applies to electronic message 200, classification scanner 212 provides electronic message to enforcer 210, adapted to apply one or more classifications to the message. Addition-ally, in certain embodiments, classification scanner 212 provides a copy of electronic message 200, along with the classification, to the classification and attributes storage element 214. In other embodiments, classification scanner 212 extracts attributes from the electronic message and sends the values of these attributes, along with the classifi-cation, to the classification and attributes storage element 214.

Classification and attributes storage element 214 is a database, network storage element, or any other appropriate electronic data storage device, capable of storing electronic messages and/or sets of attribute values, as well as classi-fication indications. In certain embodiments, classification and attributes storage element 214 is contained within training data storage element 202. The data stored in clas-sification and attributes storage element 214 is used by machine learning trainer 204 to retrain the machine learning policies stored in policy repository 206. Retraining the machine learning policies based on express indications from users helps to ensure that the machine learning policies adapt over time. In certain embodiments, express indications from users regarding the classifications of electronic messages are only used to retrain machine learning policies stored in policy repository 206 when machine learning scanner 208 has determined that one or more classifications do not apply to the electronic message. In this manner, machine learning trainer 204 will not update machine learn-ing policies stored in policy repository 206 in situations in which a user either mistakenly (or knowingly) labels an electronic message as unclassified despite the fact that a classification does apply to the message.

If classification scanner 212 determines either that elec-tronic message 200 contains an express indication that a classification does not apply to the message, or that elec-tronic message 200 does not contain an express indication that a classification does or does not apply to the message, classification scanner 212 sends the electronic message 200 to its intended recipient.

FIGS. 3A through 3D illustrate examples of the operation of the components of FIG. 2, in response to machine learning scanner 208 receiving four different electronic messages.

Figure 3A:
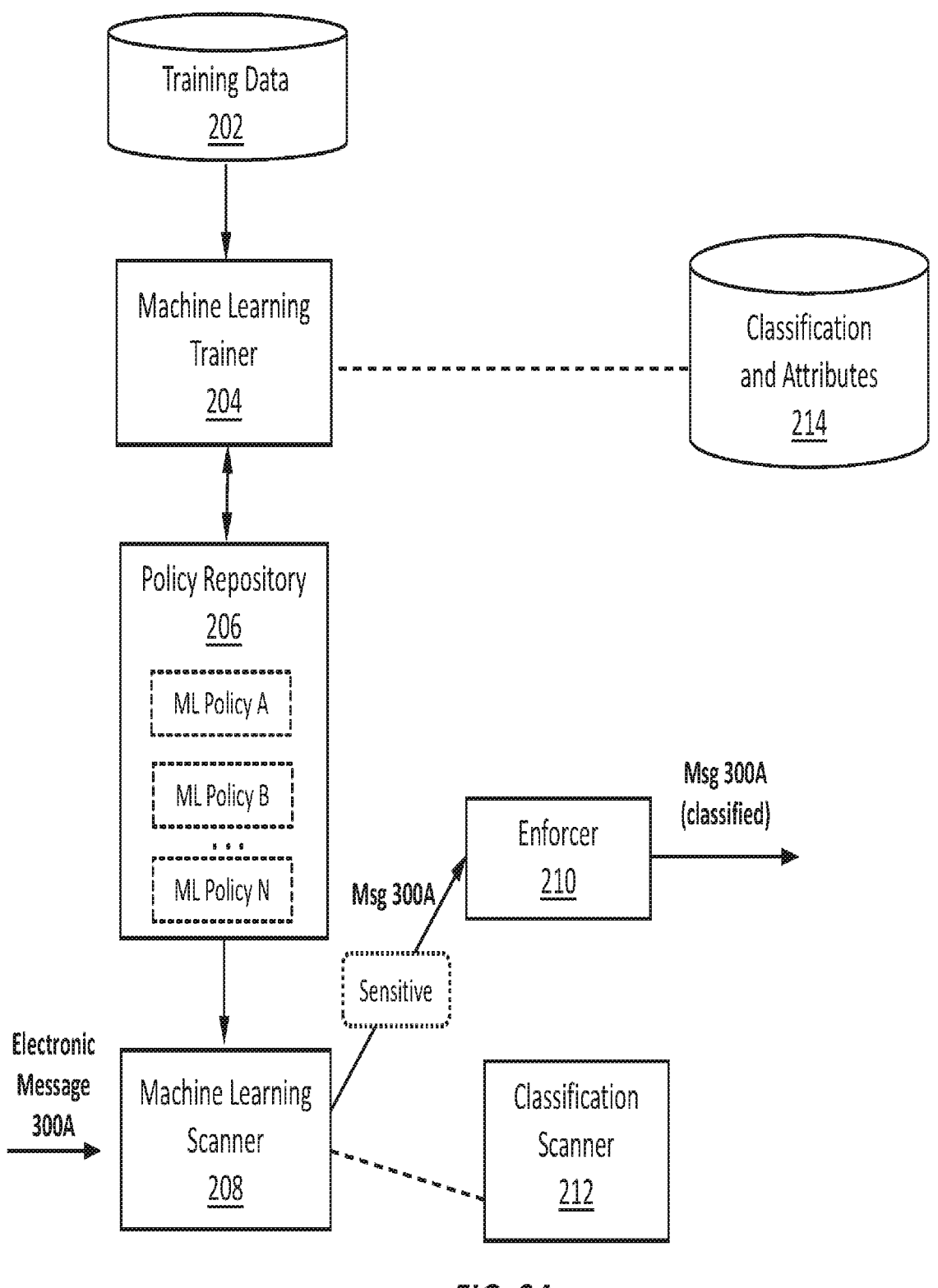
FIGS. 3A through 3D illustrate examples of the behavior of the components of FIG. 2 in response to receiving an electronic message, in accordance with certain embodiments.

FIG. 3A illustrates an example in which machine learning scanner 208 invokes enforcer 210, when machine learning scanner 208 determines that a classification applies to elec-tronic message 300A. In FIG. 3A, machine learning scanner 208 receives electronic message 300A from a user, deter-mines a machine learning policy that applies to the user, and determines, based on the machine learning policy, that a classification applies to the electronic message. In certain embodiments, prior to applying the machine learning policy, machine learning scanner 208 first determines whether a regulatory policy applies to the user from whom electronic message 300A was received. If machine learning scanner 208 determines that a regulatory policy applies to the user, machine learning scanner 208 enables the machine learning policy to use those attributes in the set of attributes that are based on the regulatory policy. If machine learning scanner 208 determines that a regulatory policy does not apply to the user, machine learning scanner 208 disables the machine learning policy from using those attributes in the set of attributes that are based on the regulatory policy.

As discussed above, in certain embodiments, machine learning scanner 208 determines that a classification applies to an electronic message 300A by first identifying message attributes of the electronic message that correspond to attributes of the machine learning policy. Specifically, in certain embodiments, for each policy attribute in the set of attributes, machine learning scanner 208 sets the value associated with the policy attribute to a first value when a corresponding message attribute has been identified and sets the value associated with the policy attribute to a second value different from the first value when a corresponding message attribute has not been identified. The first value may be set to "1," "true," "yes," or any other appropriate value, while the second value may be set to "0," "false," "no," or any other appropriate value different from the first value. Once machine learning scanner 208 has assigned values to each attribute in the set of attributes, it then determines, based on the values of the attributes, that a confidence level that the classification applies to electronic message 300A exceeds a threshold.

Once machine learning scanner 208 determines that a classification applies to electronic message 300A, machine learning scanner 208 sends electronic message 300A to enforcer 210 to apply the classification. As discussed above, examples of classifications that may apply to electronic message 300A include encryption (or non-encryption), quar-antine (or non-quarantine), archive (or non-archive), and/or brand (or non-brand) classifications. After applying the classification, enforcer 210 sends electronic message 300A to its intended recipient.

Figure 3B:
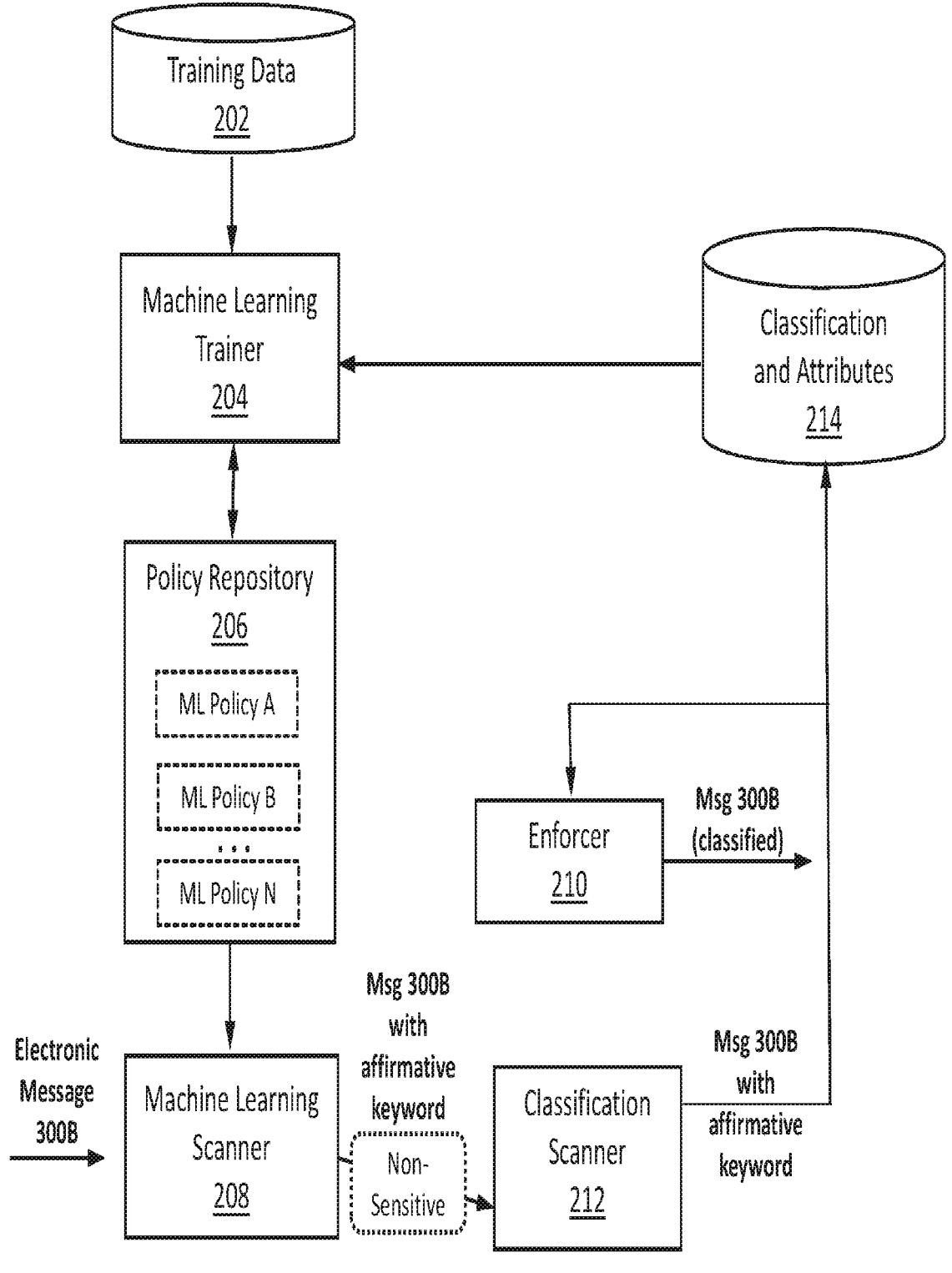

FIG. 3B illustrates an example in which classification scanner 212, rather than machine learning scanner 208, invokes enforcer 210. In FIG. 3B, machine learning scanner 208 receives electronic message 300B from a user, determines a machine learning policy that applies to the user, and determines, based on the machine learning policy, that a classification does not apply to the electronic message. In certain embodiments, prior to applying the machine learning policy, machine learning scanner 208 first determines whether a regulatory policy applies to the user from whom electronic message 300B was received. If machine learning scanner 208 determines that a regulatory policy applies to the user, machine learning scanner 208 enables the machine learning policy to use those attributes in the set of attributes that are based on the regulatory policy. If machine learning scanner 208 determines that a regulatory policy does not apply to the user, machine learning scanner 208 disables the machine learning policy from using those attributes in the set of attributes that are based on the regulatory policy.

As discussed above, in certain embodiments, machine learning scanner 208 determines that a classification does not apply to an electronic message 300B by first identifying message attributes of the electronic message that correspond to attributes of the machine learning policy. Specifically, in certain embodiments, for each policy attribute in the set of attributes, machine learning scanner 208 sets the value associated with the policy attribute to a first value when a corresponding message attribute has been identified and sets the value associated with the policy attribute to a second value different from the first value when a corresponding message attribute has not been identified. The first value may be set to "1," "true," "yes," or any other appropriate value, while the second value may be set to "0," "false," "no," or any other appropriate value different from the first value. Once machine learning scanner 208 has assigned values to each attribute in the set of attributes, it then determines, based on the values of the attributes, that a confidence level that the classification applies to electronic message 300B does not exceed a threshold.

Once machine learning scanner 208 determines that a classification does not apply to electronic message 300B, machine learning scanner 208 sends electronic message 300B to classification scanner 212, to determine if a user has included an express indication that a classification does or does not apply to electronic message 300B. As discussed above, examples of classifications that may apply to electronic message 200 include encryption (or non-encryption), quarantine (or non-quarantine), archive (or non-archive), and/or brand (or non-brand) classifications. Accordingly, classification scanner 212 may include an encryption scanner, a quarantine scanner, an archive scanner, a brand scanner, and/or other suitable scanner(s).

The encryption scanner determines whether the user has expressly indicated that the electronic message is to be encrypted. The quarantine scanner determines whether the user has expressly indicated that the electronic message is to be quarantined. As an example, a user may indicate to quarantine certain electronic messages in order to perform security procedures, such as malware detection and remediation. The archive scanner determines whether the user has expressly indicated that the message is to be archived. As an example, a user may indicate to archive an important electronic message in a database or file management system for future reference. The brand scanner determines whether the user has expressly indicated that the message is to be branded. As an example, a user may indicate to brand the electronic message with a business logo or trade dress, a designation (e.g., "confidential," "proprietary," "draft"), a watermark (e.g., recipient's name, date, etc.), or other information. In the example of FIG. 3B, classification scanner 212 determines that electronic message 300B contains an express indication that a classification applies to the message. As an example, if the user types an affirmative keyword in the subject line (e.g., "classified," "privileged," "confidential," "personal," "proprietary," "encrypt," "quarantine," "archive," "brand," and/or other suitable keyword), classification scanner 212 determines that a classification applies. Other examples of express indicators include a flag configured by the user (e.g., by typing a command, clicking a button, or selecting a menu item) to indicate that the classification applies. As a result, classification scanner 212 sends electronic message 300B to enforcer 210, adapted to apply the classification. After applying the classification, enforcer 210 sends electronic message 300B to its intended recipient.

Additionally, in certain embodiments, classification scanner 212 provides a copy of electronic message 300B, along with the classification, to the classification and attributes storage element 214. In other embodiments, classification scanner 212 extracts attributes from the electronic message and sends the values of these attributes, along with the classification, to the classification and attributes storage element 214. The data stored in classification and attributes storage element 214 is used by machine learning trainer 204 to retrain the machine learning policies stored in policy repository 206. Retraining the machine learning policies based on express indications from users helps to ensure that the machine learning policies adapt over time.

Figure 3C:
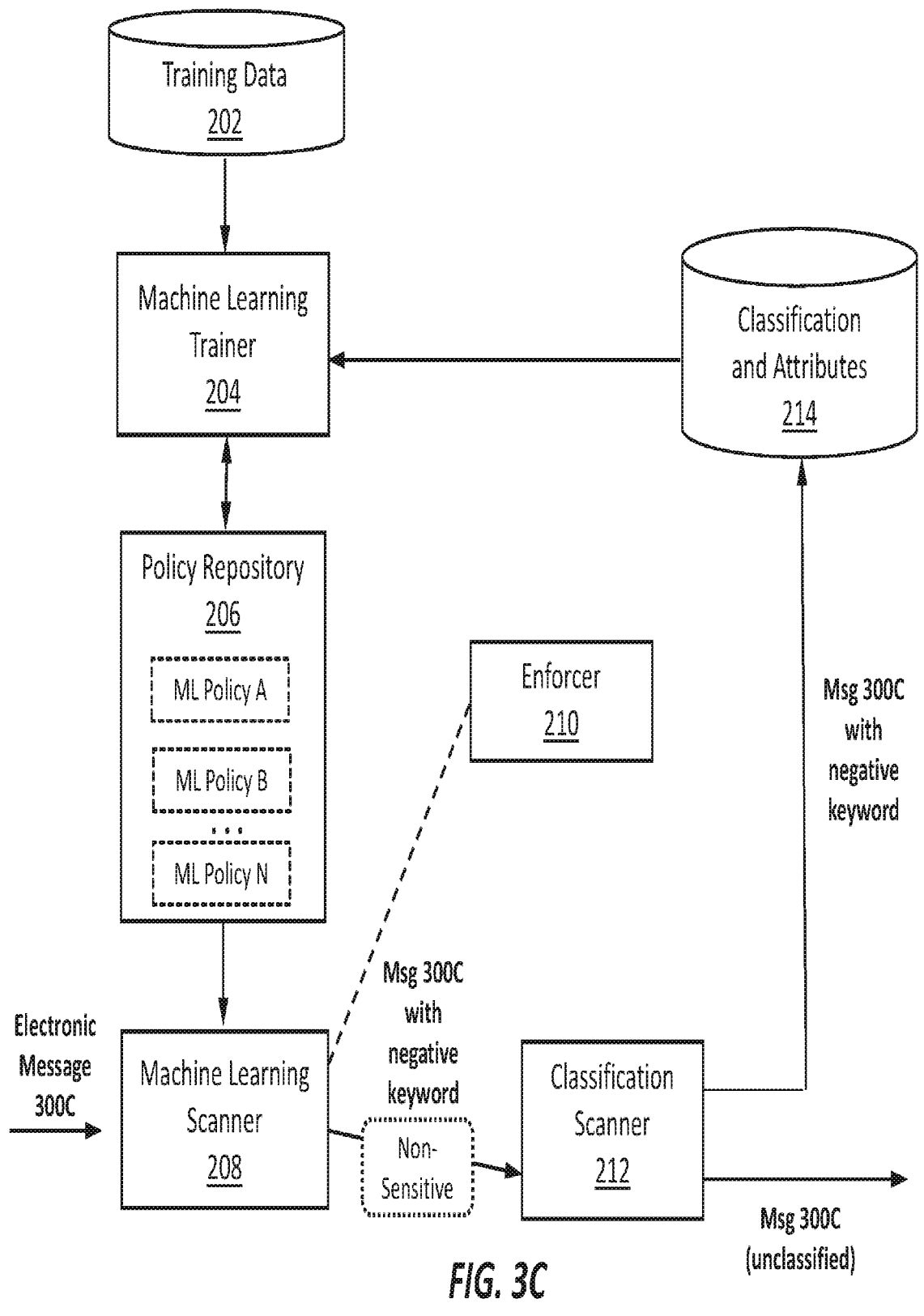

FIG. 3C illustrates an example of bypassing enforcer 210, when machine learning scanner 208 determines that a classification does not apply to electronic message 300C and electronic message 300C contains an express indication that a classification does not apply. Here, machine learning scanner 208 receives electronic message 300C from a user, determines a machine learning policy that applies to the user, and determines, based on the machine learning policy, that a classification does not apply to the electronic message.

Once machine learning scanner 208 determines that a classification does not apply to electronic message 300C, machine learning scanner 208 sends electronic message 300C to classification scanner 212, to determine if the user has included an express indication that a classification does or does not apply to electronic message 300C.

In the example of FIG. 3C, classification scanner 212 determines that electronic message 300C contains an express indication that a classification does not apply to the message. As an example, if the user types a negative keyword in the subject line (e.g., "unclassified," "public," and/or other suitable keyword), classification scanner 212 determines that a classification applies. Other examples of express indicators include a flag configured by the user (e.g., by typing a command, clicking a button, or selecting a menu item) to indicate that the classification does not apply. As a result, classification scanner 212 sends electronic message 300C to its intended recipient, bypassing enforcer 210. Additionally, in certain embodiments, classification scanner 212 provides a copy of electronic message 300C, along with the express indication that a classification does not apply, to the classification and attributes storage element 214. In other embodiments, classification scanner 212 extracts attributes from the electronic message and sends the values of these attributes, along with the express indication that the classification does not apply, to the classification and attributes storage element 214. The data stored in classification and attributes storage element 214 is used by machine learning trainer 204 to retrain the machine learning policies stored in policy repository 206. Retraining the machine learning policies based on express indications from users helps to ensure that the machine learning policies adapt over time.

Figure 3D:
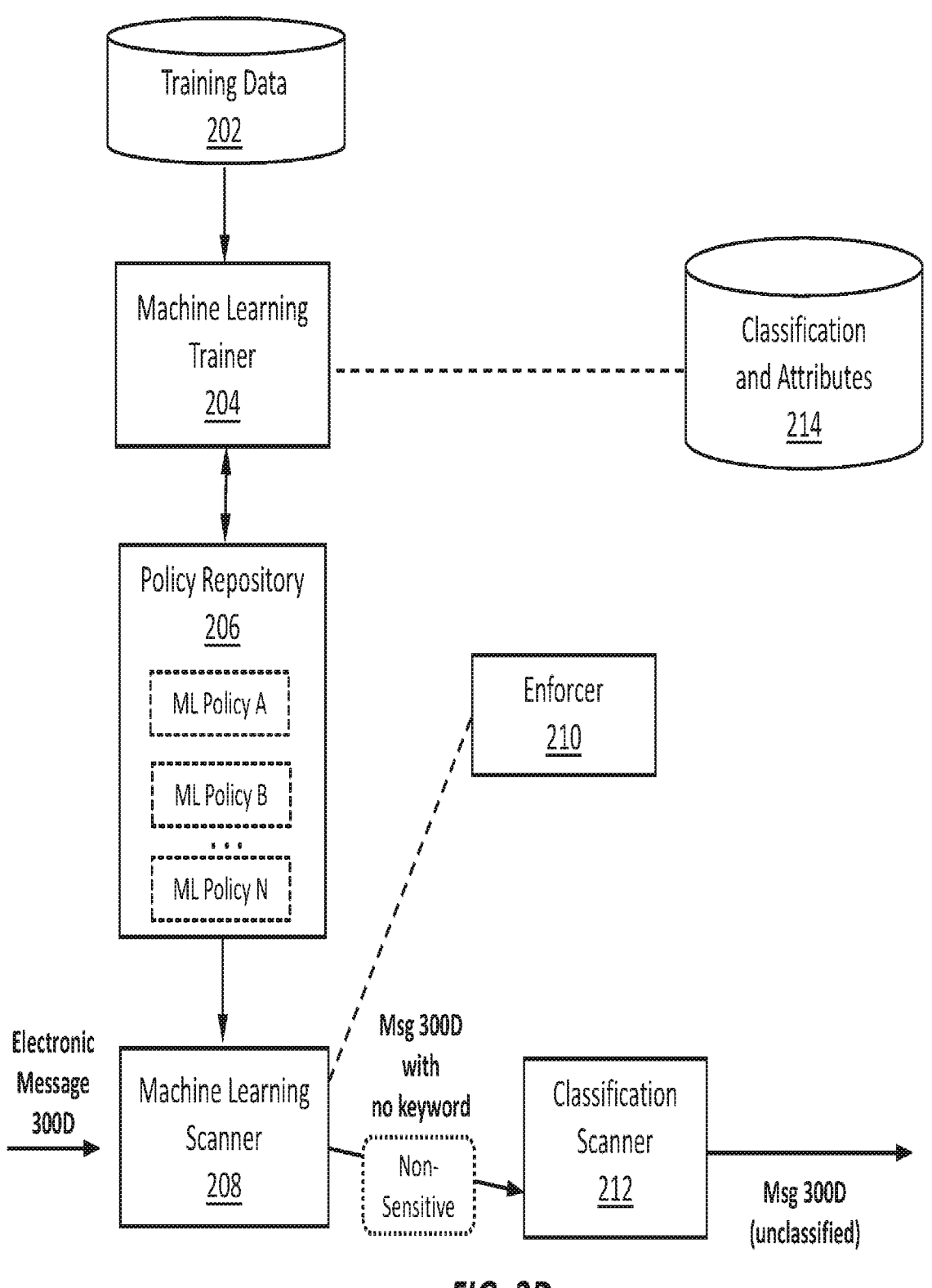

FIG. 3D illustrates an example of bypassing enforcer 210, when machine learning scanner 208 determines that a classification does not apply to electronic message 300D and electronic message 300D does not contain an express indication that a classification either applies to the message or does not apply to the message. Here, machine learning scanner 208 receives electronic message 300D from a user, determines a machine learning policy that applies to the user, and determines, based on the machine learning policy, that a classification does not apply to the electronic message.

Once machine learning scanner 208 determines that a classification does not apply to electronic message 300D, machine learning scanner 208 sends electronic message 300D to classification scanner 212, to determine if the user has included an express indication that a classification does or does not apply to electronic message 300D.

In the example of FIG. 3D, classification scanner 212 determines that electronic message 300D does not contain an express indication that a classification does or does not apply to the message. For example, if the affirmative keywords and negative keywords are all absent from the subject line, or if the user has not configured a flag that expressly enables or expressly disables a classification, the classification scanner 212 determines that electronic message 300D does not contain an express indicator. As a result, classification scanner 212 simply sends electronic message 300D to its intended recipient.

FIGS. 3C-3D describe examples in which classification scanner 212 determines whether to provide an electronic message (or attribute values extracted from the electronic message) for the purposes of retraining a machine learning policy. When providing the electronic message (or attribute values), classification scanner 212 also provides the express indication that the classification does or does not apply. In embodiments that support multiple types of classification (e.g., two or more of: encryption, quarantine, archive, and brand classifications), classification scanner 212 may provide information for each type of classification. As one example, classification scanner 212 may indicate that classification A expressly applies, classification B expressly does not apply, and classification C lacks any express indicator (e.g., such that the electronic message/attributes provided by classification scanner 212 are not used to retrain a machine learning policy associated with classification C).

Although FIGS. 3A through 3D illustrate examples in which either classification scanner 212 or enforcer 210 sends electronic message 300 to the intended recipient, in other embodiments, classification scanner 212 and/or enforcer 210 do not send electronic message 300 to the intended recipient. For example, in certain embodiments, classification scanner 212 may provide machine learning trainer 204 (through classification and attributes storage element 214) with archived/previously sent electronic messages 300 for training purposes. Such archived/previously sent electronic messages 300 need not be sent to the recipient.

FIG. 4 illustrates an example of a method for updating a machine learning policy based on an express indication from a user, in accordance with certain embodiments. In certain embodiments, the method may be performed by classification scanner 212. The method may begin at step 402 by receiving an electronic message. For example, machine learning scanner 208 may receive message 300 from a user.

At step 404, the method determines that the electronic message includes an express indication from a user that either expressly indicates that a classification applies to the electronic message or expressly indicates that the classification does not apply. Examples of express indicators include a flag configured by the user (e.g., by typing a command, clicking a button, or selecting a menu item) or a keyword that the classification scanner associates with enabling the classification (such as the presence of the word "encrypt" in the subject line). The user may provide the express indicator when sending the electronic message to an intended recipient. In addition, or in the alternative, the user may provide the express indication as feedback associated with an electronic message that was previously sent (e.g., an administrator may select certain archived messages to train machine learning trainer 204). As described above, examples of classifications that may apply to an electronic message include encryption, quarantine, archive, and/or brand applies to electronic message 200.

In step 406, the method identifies message attributes of the electronic message that correspond to policy attributes of a machine learning policy. Examples of attributes that may be included in a machine learning policy include the presence or absence of certain words or phrases (for example, in the context of a HIPAA regulatory policy, such words could include the name of a particular medical condition or medication), the presence of particular patterns (for example, an arrangement of numbers in the format of a social security number), the frequency with which certain words or phrases appear in the electronic message, the sender of the electronic message, the recipient of the electronic message, the domain of the sender, the domain of the recipient, message size, whether the electronic message includes certain attachments, whether the electronic message includes links to certain data, whether the electronic message is associated with certain metadata, whether the electronic message or its contents are associated with certain computing resources (such as a private/classified portion of a network or storage media), the date of the electronic message, other suitable attributes, or any combination of the preceding.

In step 408, the method determines values of the policy attributes based on the identified message attributes. In certain embodiments, determining values of the policy attributes based on the identified message attributes includes setting the value associated with a policy attribute to a first value when a corresponding message attribute has been identified, and setting the value associated with the policy attribute to a second value different from the first value when a corresponding message attribute has not been identified. The first value may be set to "1," "true," "yes," or any other appropriate value, while the second value may be set to "0," "false," "no," or any other appropriate value different from the first value.

Finally, in step 410, the method provides information to machine learning trainer 204 adapted to train machine learning policies stored in policy repository 206. The information provided includes the values of the policy attributes as well as information indicating the classification that applies to the electronic message or the classification that does not apply. Machine learning trainer 204 is adapted to update a machine learning policy that associates the policy attributes of electronic message 200 with the classification and to store the updated machine learning policy in policy repository 206. In certain embodiments, the machine learning policy to be updated corresponds to one of a plurality of machine learning policies, and classification scanner 212 indicates to machine learning trainer 204 which of the machine learning policies to train with the electronic message. Additionally, in certain embodiments, classification scanner 212 may indicate to train multiple machine learning policies with the electronic message.

FIGS. 5A and 5B present examples of values of policy attributes determined for two different electronic messages. Here, for simplicity, the policy attributes of the machine learning policy applied to the two messages are labeled A through J. Examples of attributes that may be included in the machine learning policy include the presence or absence of certain words or phrases (for example, in the context of a HIPAA regulatory policy, such words could include the name of a particular medical condition or medication), the presence of particular patterns (for example, an arrangement of numbers in the format of a social security number), the frequency with which certain words or phrases appear in the electronic message, the sender of the electronic message, the recipient of the electronic message, the domain of the sender, the domain of the recipient, message size, whether the electronic message includes certain attachments, whether the electronic message includes links to certain data, whether the electronic message is associated with certain metadata, whether the electronic message or its contents are associated with certain computing resources (such as a private/classified portion of a network or storage media), the date of the electronic message, other suitable attributes, or any combination of the preceding.

For a given electronic message, determining the values of the policy attributes consists of identifying message attributes of the electronic message that correspond to attributes of the machine learning policy, and then setting the value associated with the policy attribute to a first value ("1" in this example) when a corresponding message attribute has been identified and setting the value associated with the policy attribute to a second value different from the first value ("0" in this example) when a corresponding message attribute has not been identified. While "1" and "0" are used for the attribute values in the examples of FIGS. 5A and 5B, this disclosure contemplates that any appropriate values or data types may be used, including binary, ordinal, numeral, cardinal, enum, etc. As an example, certain embodiments may set the first value to "true" and the second value to "false," or certain embodiments may set the first value to "yes" and the second value to "no." As another example, when a corresponding message attribute has been identified, certain embodiments may set the first value to any real number or any other suitable combination of characters, such characters obtained from the message that correspond to the message attribute. When a corresponding message attribute has not been identified, these embodiments may set the second value to no data (e.g., blank, null, etc.).

The example in FIG. 5A illustrates an electronic message which contains the attributes A, C, D, F, I, and J, but not B, E, G, or H. The example in FIG. 5B illustrates an electronic message which contains the attributes B, C, E, and F, but not A, E, G, H, I, or J. For example, if attribute A represents the presence of the word "medication" in a message, this indicates that the electronic message of FIG. 5A contains the word "medication," while the electronic message of FIG. 5B does not. As can be seen, based on these attribute values, the machine learning scanner has determined that the electronic message of FIG. 5A should be classified as sensitive, while the electronic message of FIG. 5B should not be classified as sensitive. Accordingly, machine learning scanner 208 will send the electronic message of FIG. 5A to enforcer 210 to apply the sensitive classification, while it will send the electronic message of FIG. 5B to classification scanner 212 to determine if the message contains an express indication from a user.

If classification scanner 212 determines that the message of FIG. 5B contains an express indication from the user, the attributes of FIG. 5B may be provided as feedback to machine learning trainer 204. As an example, machine learning trainer 204 may use the attributes of FIG. 5B to determine whether to classify future emails that contain certain combinations of the attributes B, C, E, and F. In certain embodiments, when determining whether to modify a machine learning policy, machine learning trainer 204 evaluates the attributes of FIG. 5B together with retraining information/attribute value feedback associated with at least a minimum number of other electronic messages. Thus, machine learning trainer 204 may wait to change a machine learning policy until it has sufficient information to identify a trend. As an example, if machine learning trainer 204 has received at least N electronic messages containing only attributes C and F, and if at least X % of those electronic messages expressly indicate encryption, machine learning trainer 204 may update the machine learning policy to apply encryption to future electronic messages containing attributes C and F.

Certain embodiments allow for retraining the attributes repository maintained by classification and attributes storage element 214. As an example, attributes (such as attributes A-J in FIGS. 5A-5B) can be added, removed, or modified. Suppose attribute A corresponds to a Health Insurance Claim (HIC) number, which is a number that may be used to identify a patient and that may be based on the patient's social security number. Further suppose that a new hospital policy or regulatory policy requires reducing the use of social security numbers in other identifying numbers. Accordingly, a hospital may change from using the HIC number to using another identifier, such as a Medicare Beneficiary Identifier (MBI). The MBI is used by Medicare to identify patients, dependents, etc., and it does not include a social security number. In the example, attribute A' (MBI attribute) could be added to the attributes repository to supplement or replace attribute A (HIC attribute).

Figure 6:
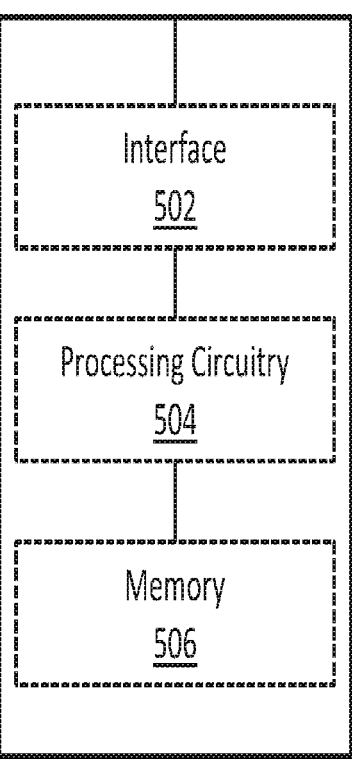
FIG. 6 illustrates examples of elements that may be included in one or more components of the computer network described with respect to FIGS. 1-3, in accordance with certain embodiments.

FIG. 6 illustrates examples of elements that may be included in one or more components of the computer network described with respect to FIGS. 1-4, in accordance with certain embodiments. For example, any of clients 102, mail delivery servers 104, gateways 106, host 120, classification scanner 202, machine learning trainer 204, machine learning scanner 304, policy repository, and/or enforcer 208 may include an interface 502, processing circuitry 504, memory 506, and/or any other suitable elements. Interface 502 receives input, sends output, processes the input and/or output, and/or performs other suitable operation. Interface 502 may comprise hardware and/or software.

Processing circuitry 504 performs the operations of the component, for example, executes instructions to generate output from input. Processing circuitry 504 may include hardware, software, and/or other processing circuitry. Processing circuitry 504 may be encoded in one or more tangible media and may preform operations when executed by a computer. Certain processing circuitry, such as a processor, may manage the operation of a component. Examples of processing circuitry (or a processing unit) include one or more computers, one or more microprocessors, one or more applications, and/or other processing circuitry. In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 506 (or memory unit) stores information. Memory 506 may comprise one or more non-transitory, tangible, computer-readable, and/or computer-executable storage media. Examples of memory 506 include computer memory (for example, Random Access Memory (RAM) or Read Only Memory (ROM), mass storage media (for example, a Compact Disk (CD) or a Digital Video Disk (DVD)), database, and/or network storage (for example, a server), and/or other computer-readable medium.

Modifications, additions, or omissions may be made to the systems and apparatuses disclosed herein without departing from the scope of the invention. For example, although certain embodiments have described using encrypting, quarantining, archiving, and/or branding as examples of classifications, other embodiments may use other classifications to ensure that the electronic message complies with one or more policies, rules, user preferences, and/or other compliance criteria associated with the classification.

The components of the systems and apparatuses may be integrated or separated. Moreover, the operations of the systems and apparatuses may be performed by more, fewer, or other components. A system may be comprised within a single apparatus, or a system may be distributed among multiple apparatuses, such as apparatuses that are communicatively coupled via one or more networks. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method, comprising:

receiving a plurality of electronic messages from a database;

reading from each of the plurality of electronic messages an express indication indicating whether or not a classification applies to an electronic message of the plurality of electronic messages;

identifying a plurality of attributes included in the plurality of electronic messages;

determining a confidence level based on the plurality of attributes, wherein the confidence level is used by a machine learning engine to determine whether the classification applies to the electronic message;

from among the plurality of attributes, creating a first training set of attributes to which the classification is known to apply;

from among the plurality of attributes, creating a second set of attributes to which the classification is known not to apply; and training the machine learning engine using the first and the second training sets;

receiving a first electronic message;

determining the first electronic message includes an express indication that either indicates the classification applies to the first electronic message or does not apply to the first electronic message, wherein the express indication comprises a word or a flag configured by a user;

identifying a first attribute of the first electronic message;

applying the machine learning engine to the first attribute to determine the classification applies to the first electronic message;

providing the first electronic message to an enforcer adapted to apply the classification to the first electronic message, wherein the enforcer applies the classification by performing one or more actions associated with the classification;

receiving a second electronic message;

identifying a second attribute of the second electronic message;

applying the machine learning engine to the second attribute to determine the classification does not apply to the second electronic message; and bypassing the enforcer based on the determination.

2. The method of claim 1, wherein the application of the classification to the first electronic message is based on a regulatory policy.

3. The method of claim 2, wherein the application of the classification to the first electronic message comprises performing an action specified by the regulatory policy.

4. The method of claim 3, further comprising determining whether the regulatory policy applies to the first electronic message or the user.

5. The method of claim 4, wherein the machine learning engine is trained based on information indicating whether the regulatory policy applies to the first electronic message of the user.

6. The method of claim 1, wherein the express indication is in content of the first electronic message.

7. The method of claim 1, further comprising:

setting a value associated with an attribute of the machine learning engine to a first value when a corresponding message attribute has been identified in the first electronic message; and setting the attribute of the machine learning engine to a second value when a corresponding message attribute is not identified in the second electronic message.

8. A system, comprising:

a processor; and a non-transitory computer readable medium, comprising instructions for:

receiving a plurality of electronic messages from a database;

reading from each of the plurality of electronic messages an express indication indicating whether or not a classification applies to an electronic message of the plurality of electronic messages;

identifying a plurality of attributes included in the plurality of electronic messages;

determining a confidence level based on the plurality of attributes, wherein the confidence level is used by a machine learning engine to determine whether the classification applies to the electronic message;

from among the plurality of attributes, creating a first training set of attributes to which the classification is known to apply;

from among the plurality of attributes, creating a second set of attributes to which the classification is known not to apply; and training the machine learning engine using the first and the second training sets;

receiving a first electronic message;

determining the first electronic message includes an express indication that either indicates the classification applies to the first electronic message or does not apply to the first electronic message, wherein the express indication comprises a word or a flag configured by a user;

identifying a first attribute of the first electronic message;

applying the machine learning engine to the first attribute to determine the classification applies to the first electronic message;

providing the first electronic message to an enforcer adapted to apply the classification to the first electronic message, wherein the enforcer applies the classification by performing one or more actions associated with the classification;

receiving a second electronic message;

identifying a second attribute of the second electronic message;

applying the machine learning engine to the second attribute to determine the classification does not apply to the second electronic message; and bypassing the enforcer based on the determination.

9. The system of claim 8, wherein the application of the classification to the first electronic message is based on a regulatory policy.

10. The system of claim 9, wherein the application of the classification to the first electronic message comprises performing an action specified by the regulatory policy.

11. The system of claim 10, wherein the instructions further comprise instructions for determining whether the regulatory policy applies to the first electronic message or the user.

12. The system of claim 11, wherein the machine learning engine is trained based on information indicating whether the regulatory policy applies to the first electronic message or the user.

13. The system of claim 8, wherein the express indication is in content of the first electronic message.

14. The system of claim 8, further comprising:

setting a value associated with an attribute of the machine learning engine to a first value when a corresponding message attribute has been identified in the first electronic message; and setting the attribute the machine learning engine to a second value when a corresponding message attribute is not identified in the second electronic message.

15. A non-transitory computer readable medium, comprising instructions for:

receiving a plurality of electronic messages from a database;

reading from each of the plurality of electronic messages an express indication indicating whether or not a classification applies to an electronic message of the plurality of electronic messages;

identifying a plurality of attributes included in the plurality of electronic messages;

determining a confidence level based on the plurality of attributes, wherein the confidence level is used by a machine learning engine to determine whether the classification applies to the electronic message;

from among the plurality of attributes, creating a first training set of attributes to which the classification is known to apply;

from among the plurality of attributes, creating a second set of attributes to which the classification is known not to apply; and training the machine learning engine using the first and the second training sets;

receiving a first electronic message;

determining the first electronic message includes an express indication that either indicates the classification applies to the first electronic message or does not apply to the first electronic message, wherein the express indication comprises a word or a flag configured by a user;

identifying a first attribute of the first electronic message;

applying the machine learning engine to the first attribute to determine the classification applies to the first electronic message;

providing the first electronic message to an enforcer adapted to apply the classification to the first electronic message, wherein the enforcer applies the classification by performing one or more actions associated with the classification;

receiving a second electronic message;

identifying a second attribute of the second electronic message;

applying the machine learning engine to the second attribute to determine the classification does not apply to the second electronic message; and bypassing the enforcer based on the determination.

16. The non-transitory computer readable medium of claim 15, wherein the application of the classification to the first electronic message is based on a regulatory policy.

17. The non-transitory computer readable medium of claim 16, wherein the application of the classification to the first electronic message comprises performing an action specified by the regulatory policy.

18. The non-transitory computer readable medium of claim 17, further comprising determining whether the regulatory policy applies to the first electronic message or the user.

19. The non-transitory computer readable medium of claim 18, wherein the machine learning engine is trained based on information indicating whether the regulatory policy applies to the first electronic message or the user.

20. The non-transitory computer readable medium of claim 15, wherein the express indication is in content of the first electronic message.

21. The non-transitory computer readable medium of claim 15, further comprising:

setting a value associated with an attribute of the machine learning engine to a first value when a corresponding message attribute has been identified in the first electronic message; and setting the attribute the machine learning engine to a second value when a corresponding message attribute is not identified in the second electronic message.

\* \* \* \* \*